United States Patent [19]

Torok

[11] 3,728,523

[45] Apr. 17, 1973

[54] INFORMATION SYSTEM

[75] Inventor: Vilmos Torok, Vasteras, Sweden

[73] Assignee: Allmanna Svensha Elektriska Aktiebolaget, Vasteras, Sweden

[22] Filed: Dec. 23, 1971

[21] Appl. No.: 211,248

[30] Foreign Application Priority Data

Jan. 19, 1971 Sweden ....................565/71

[52] U.S. Cl...235/61.11 H, 235/61.12 C, 235/61.7 B

[51] Int. Cl. ....................G06r 19/00, G06r 7/08

[58] Field of Search ..........235/61.12 N, 61.12 C, 235/61.11 H, 61.11 D, 61.12 M, 61.7 B

[56] References Cited

UNITED STATES PATENTS

| | | | |
|---|---|---|---|
| 3,185,964 | 5/1965 | Margiloff | 235/61.12 C |
| 3,604,900 | 9/1971 | Kalt | 235/61.12 N |
| 3,189,731 | 6/1965 | Bowman | 235/61.11 H |

*Primary Examiner*—Thomas A. Robinson

*Attorney*—Jennings Bailey, Jr.

[57] ABSTRACT

An information system includes an information carrier and a reading unit. The information carrier includes an inner and an outer layer, the outer layer constituting a protective casing surrounding the inner layer and hiding the information. The inner part is formed of at least one electrically conducting closed loop in which an electrical current is intended to be induced, this loop having a plurality of openings therein in the same plane. These openings are so positioned that at least two parallel current paths are produced partly in the loop. One of the current paths is decreased in its average area by at least one interruption so that the other current path will carry the main part of the current induced through the loops. A combination of these interruptions forms the information on the carrier. The reading units include an arrangement for detecting differences in the currents in said paths.

3 Claims, 7 Drawing Figures

Fig. 1
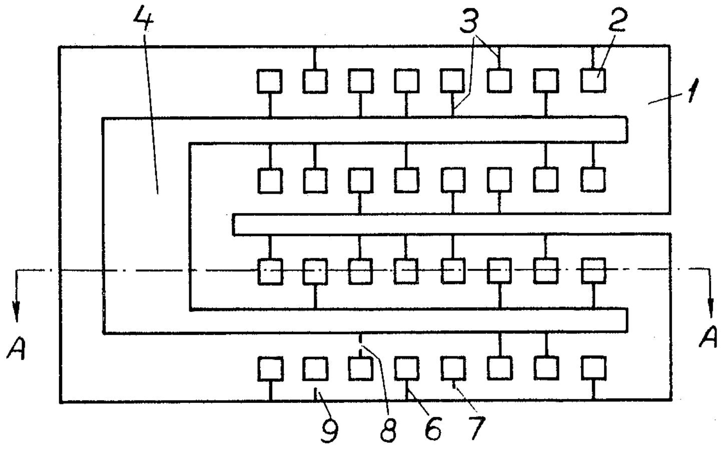
Fig. 2
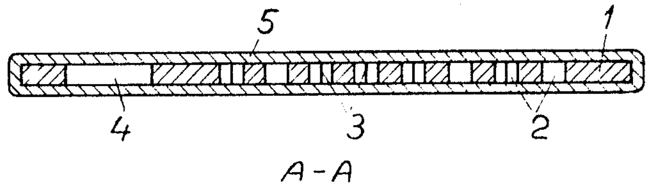
Fig. 3a Fig. 3b
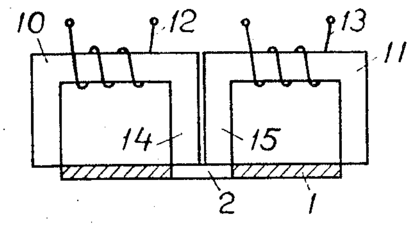
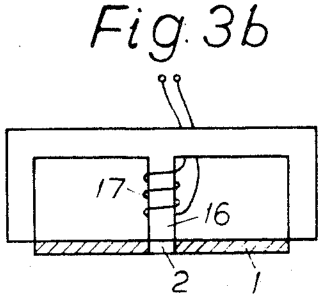

INFORMATION SYSTEM

BACKGROUND OF THE INVENTION

1. Field of the Invention

The present invention relates to an information system comprising an information carrier and a reading unit, the information carrier comprising one inner and one outer layer, the outer layer consisting of a protective casing surrounding said inner layer and hiding the information.

A good information carrier should comprise as few units as possible and should have easily read information. This information should comprise the simplest possible configurations. Furthermore, it is desirable for the information to be readable or visible only to the intended reading unit and that the information cannot be completely or partially erased, replaced or added to.

Previously known information systems exist in which only one or a few of the above desires can be considered fulfilled. For example, previously known information carriers consist of flat sheets with holes punched through the sheets to form some sort of code, the holes being completely or partially masked by means of a layer surrounding the sheet.

Other types may consist of flat information carriers having light and dark fields having certain varying isotope coating or just of the punched card type.

One disadvantage with the known types is that they are either easy to copy or they are too complicated

SUMMARY OF THE INVENTION

The object of the present invention is to effect an information system comprising information carrier and reading unit, with the help of which the desired results are achieved while avoiding the drawbacks mentioned above.

The invention is characterized in that the inner part of the information carrier comprises at least one electrically conducting closed loop in which an electric current is intended to be induced, that in said loop in one and the same plane are arranged a number of openings, that said openings are arranged so that at least two parallel current paths are produced partially in the loop, one of said current paths being decreased in its average area by interruption so that the other current path will carry the main part of the current induced through the loop, and that a combination of said interruptions form the information on the carrier.

The information carrier of the system according to the invention consists of only two main units, the loop and the surrounding casing. The information, i.e. the current path taken by the main part of the current induced in the loop, is easy to detect by means of a reading unit of the type described herein. The information is easy to apply. The interruptions are preferably in the form of very well-defined slits which are almost impossible to erase. The outer surrounding layer is shaped so that the information and/or the loop are invisible except to the reading unit.

There are several variations of the loop. The criterion is only to create an optimum design within a certain limited area for the reading unit and to insert an optimum quantity of information on the loop.

BRIEF DESCRIPTION OF THE DRAWINGS

The information will be further described with reference to the accompanying drawings in which FIG. 1 shows an embodiment of the loop-forming part of the information carrier according to the invention, FIG. 2 shows a section of the loop according to FIG. 1, FIGS. 3*a* and 3*b* show two different embodiments of the reading unit.

DESCRIPTION OF THE PREFERRED EMBODIMENTS

Figure 4A:
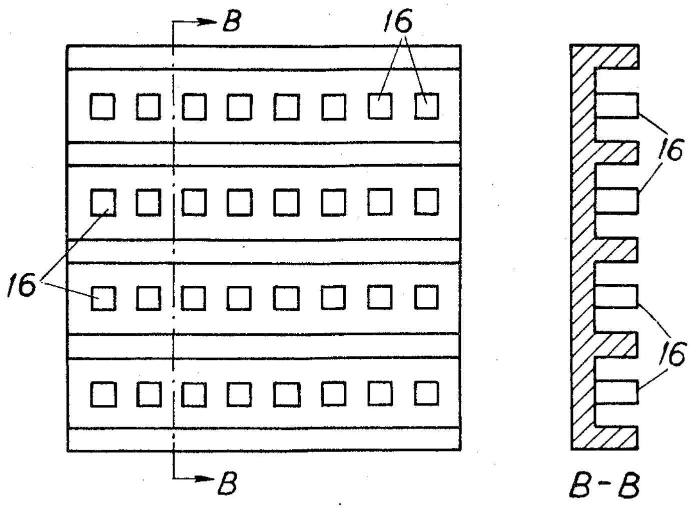
FIG. 4*a* shows a number of reading units according to FIG. 3*b* fitted together to form a larger unit.

The following is a detailed description of an information system according to the invention with reference to the embodiments shown by way of example in the accompanying drawings.

FIG. 1 shows an embodiment of a loop 1 included in the information carrier. This is provided with said openings 2. Slits 3 provide the information. The slits 3 can partially or completely shut off one of two alternative current paths around an opening 2. See the components 6, 7, 8 and 9 in the figure. Information can also be obtained, of course, by making slits 3 on both sides of the opening 2, in which case one slit is made longer. The opening 4 provides a gap for the activating AC current flow.

FIG. 2 shows a section A—A from FIG. 1. FIG. 2 also shows the casing 5 surrounding the loop 1. The material and thickness of the casing are such that the slits 3 and/or the loop 1 are completely invisible and unreadable except to the intended reading unit.

Figure 4B:
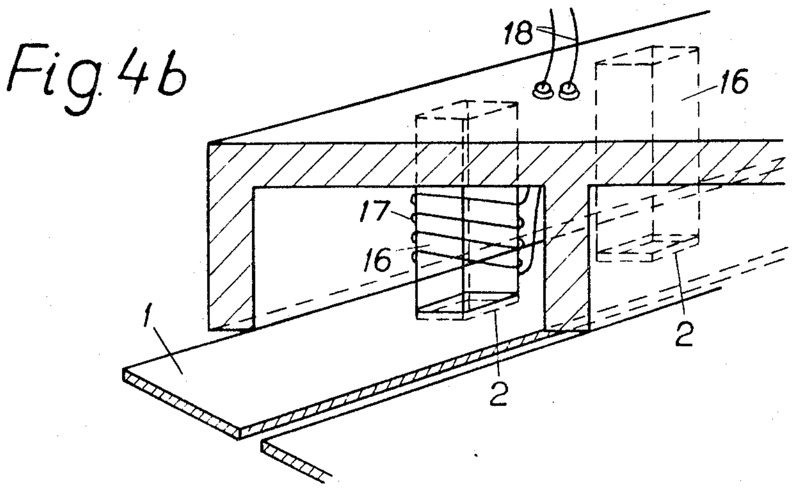
FIG. 4*b* shows another view of part of the unit according to FIG. 4*a* and a detail of a loop and FIG. 5 shows an information carrier placed in a reading unit according to FIGS. 4*a* and *b* with the surrounding equipment.

FIG. 3*a* shows the principle of the reading unit which consists of two U shaped magnetic cores 10 and 11, each having its own winding 12 and 13, respectively, applied on the loop 1 with an opening 2. The magnetic cores 10 and 11 are so positioned that one leg, 14,15, respectively, of each of the magnetic cores 10 and 11 is placed above the point where one of said openings 2 will be located when the information carrier is placed under the reading unit. FIG. 3*b* shows a more practical design of the reading unit according to FIG. 3*a*. The two legs 14 and 15 are replaced by a single leg 16 for both the magnetic cores, on which a common winding 17 is applied for both the magnetic cores 10 and 11. Reading units according to FIG. 3*b* are easy to fit together to larger units, for example for an information carrier with a loop 1 in accordance with FIG. 1. A larger unit is shown in FIG. 4*a* in two different views. The windings 17 are not shown here. FIG. 4*b* shows a part of the unit shown in FIG. 4*a* applied on a loop 1. The connections 18 are terminals for the winding 17.

Figure 5:
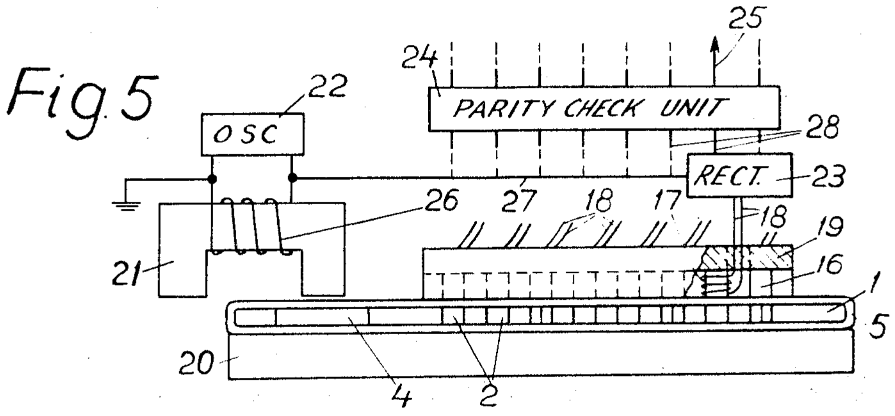

FIG. 5 shows a section through an information carrier with a loop in accordance with FIG. 1 placed under a reading unit according to FIGS. 4*a* and 4*b* with surrounding equipment. The unit 22 is an oscillator to activate the coil 26 of the magnet 21 and the unit 20 consists of a base of ferromagnetic material. It is these latter units, 22, 26, 21 and 20 which through the opening 4 generate the alternating field which produces an induced current in the loop 1. The reading unit 19 is placed with its legs 16 with the windings 17 above the openings 2 in the loop 1. The connections 18 feed a phase sensitive rectifier unit 23 which, via a connection 27, compares the phase of the voltage obtained through the connection 18 with the phase of the voltage generated by the oscillator 22. It is thus possible to determine whether the information transmitted consists of a 1 or a 0 in, for example, a binary code. The information continues via the outputs 28 from the rectifier 23 to a unit 24 where a parity check is performed, after which an output signal 25 is obtained.

If "illegal" alterations have been made, against all expectations as this would require added inventiveness, they are easily revealed with the help of the relatively simple thermophoto method.

By means of an information system according to the invention an information carrier is acquired comprising a minimum number of units where the information is easily applied and easily read by a reading unit according to the invention. Furthermore, without extremely advanced methods, the information cannot be erased or altered. Even if this does happen, there are simple ways of revealing the fact.

Information carriers and reading units according to the invention can be successfully used for personal identification to make a withdrawal at a bank, as accountcards, etc.

It is possible to insert several closed loops in one and the same plane, for example to duplicate information if part of the information carrier should be damaged or otherwise affected, or for other types of information, i.e. part of the information carrier may be used as an identity document, another part as account card, etc.

I claim:

1. Information system comprising an information carrier and a reading unit, the information carrier comprising one inner and one outer layer, the outer layer comprising a protective casing surrounding said inner layer and hiding the information, in which the inner part of the information carrier comprises at least one electrically conducting closed loop in which an electric current is intended to be induced, said loop having a plurality of openings therein in the same plane, said openings being positioned in such a way that at least two parallel current paths are produced partially in the loop, one of said current paths being decreased in its average area by at least one interruption so that the other current path will carry the main part of the current induced through the loop, a combination of said interruptions forming the information on the carrier, the reading unit including means to detect differences in the currents in said paths, said reading unit comprising a first and a second U-shaped magnetic core, each core being provided with at least one winding, said magnetic cores being positioned with one leg of each of the two magnetic cores over the position where one of said openings appears when the information carrier is placed under the reading unit, and the other two legs of the magnetic cores being positioned outside said loop, one at each side of it.

2. Information system comprising an information carrier and a reading unit, the information carrier comprising one inner and one outer layer, the outer layer comprising a protective casing surrounding said inner layer and hiding the information, in which the inner part of the information carrier comprises at least one electrically conducting closed loop in which an electric current is intended to be induced, said loop having a plurality of openings therein in the same plane, said openings being positioned in such a way that at least two parallel current paths are produced partially in the loop, one of said current paths being decreased in its average area by at least one interruption so that the other current path will carry the main part of the current induced through the loop, a combination of said interruptions forming the information on the carrier, the reading unit including means to detect differences in the currents in said paths, said reading unit comprising magnetic core means including two spaced substantially parallel legs, a central leg means and parts connecting each of said spaced legs to said central leg means, at least one coil operatively associated with said core means, said central leg means being positioned over the position where one of said openings appears when the information carrier is placed under the reading unit and the spaced legs being positioned outside said loop, one at each side of it.

3. Information system according to claim 2, in which said central leg means is a single leg and said coil surrounds said single leg.

* * * * *